US006512757B1

United States Patent
Niegel et al.

(10) Patent No.: US 6,512,757 B1
(45) Date of Patent: Jan. 28, 2003

(54) PIPELINE PROCESSING FOR DATA CHANNELS

(75) Inventors: Michael Niegel, Lauf (DE); Ralf Kukla, Nürnberg (DE); Seyed-Hami Nourbakhsh, Nürnberg (DE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/468,903

(22) Filed: Dec. 22, 1999

(30) Foreign Application Priority Data

Dec. 23, 1998 (EP) .............................. 98124457

(51) Int. Cl.⁷ .............................................. H04B 7/216
(52) U.S. Cl. .................... 370/342; 370/333; 370/342; 455/522
(58) Field of Search ................................. 370/318, 332, 370/333, 342, 441; 455/13.4, 522

(56) References Cited

U.S. PATENT DOCUMENTS

| 5,109,390 A | | 4/1992 | Gilhousen et al. | |
|---|---|---|---|---|
| 5,794,129 A | | 8/1998 | Komatsu | |
| 5,977,650 A | * | 11/1999 | Rickard et al. ............... | 307/3 |
| 6,058,362 A | * | 5/2000 | Malvar ...................... | 704/230 |
| 6,104,721 A | * | 8/2000 | Hsu .......................... | 370/431 |
| 6,219,562 B1 | * | 4/2001 | Williams .................... | 455/561 |
| 6,356,555 B1 | * | 3/2002 | Rakib et al. ................. | 370/441 |

FOREIGN PATENT DOCUMENTS

| EP | 0285192 A | 10/1988 |
|---|---|---|
| WO | WO9635268 | 11/1996 |

OTHER PUBLICATIONS

R. Skaug et al., "Operation of Portable HF CDMA Networks With Controlled Transmitter Powers", Mem. I.E.E.E., 1982, pp. 467–474.

W. Herold, "A Small–Zone Radio Telephone System With Code Division Multiple Access", Telefunken, Research Institute, Ulm, Germany, pp. 1–4.

Proc. IEEE First International Conference On Supercomputing Systems, Dec. 16–20, 1985, pp. 476–484, IEEE, St. Petersburg, Florida, US; S. Sasaki et al. "High Speed Pipeline Image Processor With A Modifiable Network".

* cited by examiner

Primary Examiner—Edward F. Urban
Assistant Examiner—Temica M. Davis

(57) ABSTRACT

Method and apparatus for processing a plurality of data channels, e.g., of a CDMA telecommunications system, using a pipeline structure. The invention allows to process channels in an interleaved fashion, where each of a plurality of pipeline stages may access channel specific data using channel addresses transmitted via addressing means. In order to synchronize the transmission of processing results and addresses associated with the data channels, the addressing means comprises a plurality of delay units. With the invention power control and measurement operations for a plurality of channels may be facilitated.

46 Claims, 8 Drawing Sheets

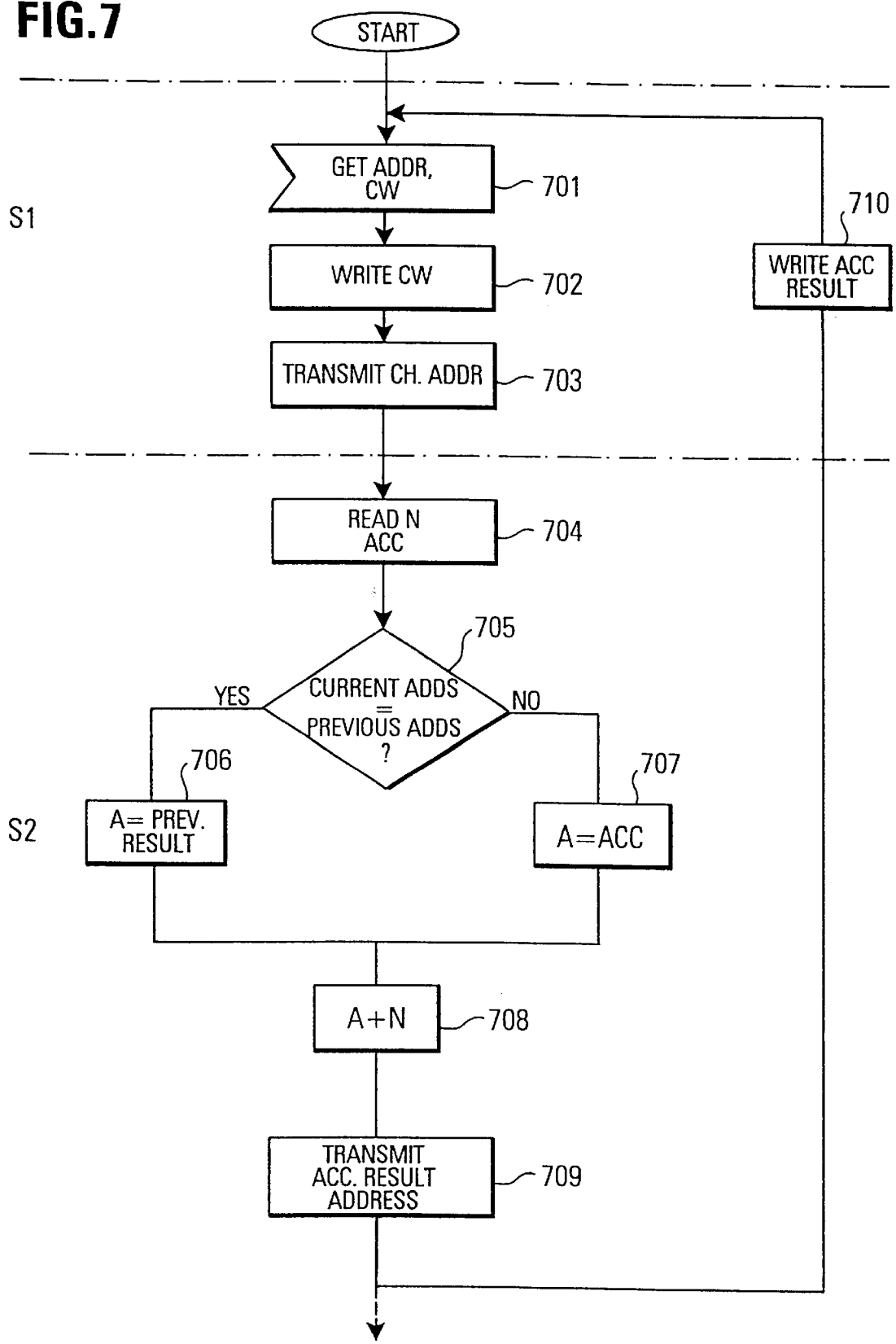

PIPELINE PROCESSING FOR DATA CHANNELS

FIELD OF THE INVENTION

The present invention relates to processing a plurality of data channels using a pipeline structure, e.g., for a power control and measurement for communications channels in a CDMA communications system.

BACKGROUND OF THE INVENTION

In the past, the processing speed of computers and computer systems has already been significantly increased. However, there is still need for ever higher processing capabilities. For example, today's mobile telecommunications systems are required to handle a potentially very large number of subscribers, which need to be serviced with a limited number of communication channels. Highly complex transmission and channel access schemes are employed for providing services, requiring very high computation capabilities.

A class of transmission schemes provides transmission of a large number of communication channels containing voice or data signals via the same transmission medium. Here, different channels are transmitted, e.g. in a radio frequency band, in such a way that they overlap in the time domain as well as in the frequency domain. A well-known access scheme of this class is CDMA (Code Division Multiple Access).

In CDMA, since all channels are transmitted together, it is required that each individual communication channel signal is distinguishable from other communication channel signals. Therefore, each communication signal is individually encoded with one or more unique spreading codes, as it is well known in the art. To compensate different spreading gains and assure a good quality of service, the transmission power of each spread channel is then individually adjusted, i.e., power weighted. Thereafter, the spread communication channels are combined into a single transmission signal to be transmitted, e.g., via the air interface.

After receiving the transmission signal at a receiving station, e.g., a mobile station, the communication channel signal intended for this station may be extracted by performing a decoding process, e.g., with the same code sequence as it was used for spreading the communication channel signal before transmission.

Mobile stations talking via the same transmission path, e.g., a CDMA channel, will be located indoors or outdoors and at different distances from an associated base station. Consequently, the transmission signal will be attenuated differently and some mobile stations will encounter difficulties in recovering information from the transmission signal intended for them.

Similarly, to avoid the above reception difficulties, as indicated above, the communication channel signals intended for remote or occluded receiving stations need to be amplified to a higher degree than the remaining communication channel signals for receiving stations located closer to the sending station. Hence, an adaptive adjustment of the transmission power of each channel needs to be performed, depending on the attenuation or quality of the radio signal received at the respective mobile station.

Therefore, prior to combining individually spread communication channels into a single transmission signal, each communication channel signal is individually weighed in order to increase or decrease its relative power in the combined transmission signal. The weighting factor for adjusting the power of a communication channel signal may be determined from the receiving quality at the corresponding receiving station.

Suppose, a target receiving quality has been chosen. If the actual receiving quality is below the target quality, the sender is instructed to increase its transmit power, e.g. increase the weighting factor. On the other hand, if the receiving quality is above the target quality, a decrease of the weighting factor may be ordered.

This command (up or down command) may be transmitted from the receiving station to the sending station, enabling the sending station to individually adjust the power levels of each communication channel signal before combining all communication channels into the transmission signal.

Further, in order to adjust power levels of communication channels for facilitating an adequate power control, the overall power of each individual power control communication channel may be measured.

In a CDMA base station, where a large number of channels is to be combined, very high frequencies are encountered and further, time delays for transmission need to be kept at a minimum. Therefore, since the power control, i.e. the weight adjustment, must be performed on all individual communication channels, demands on a hardware solution are high.

It is known in computing, in order to attain a higher data throughput, to parallelize processing tasks. Hence, it is conceivable to perform a power control and measurement for all channels individually and in parallel. However, since in a telecommunications system potentially very large numbers of communication channels needs to be serviced, associated hardware costs will be extremely high.

SUMMARY OF THE INVENTION

It is therefore object of the invention to process a plurality of data channels at reduced hardware costs, while maintaining a high processing speed and short time delay.

This object of the invention is solved by an apparatus for processing a plurality of data channels with unique channel addresses using a pipeline structure having plurality of pipeline stages, comprising addressing means for transmitting channel addresses between the pipeline stages, including time delay means associated with each of the pipeline stages, for time delaying the transmission of the channel addresses between pipeline stages, memory means included into at least one of the pipeline stages and connected to the addressing means, for storing, at a plurality of locations corresponding to respective channel addresses, data associated with each of the plurality of data channels, and processing means included into at least one of the pipeline stages, for processing at least data stored in the memory means at locations specified by the channel addresses.

The object of the invention is further solved by an apparatus for processing a plurality of data channels with unique channel addresses using a pipeline structure having plurality of pipeline stages, comprising addressing means for transmitting channel addresses between the pipeline stages, including time delay means associated with each of the pipeline stages, for time delaying the transmission of the channel addresses between pipeline stages, memory means included into at least one of the pipeline stages and connected to the addressing means, for storing, at a plurality of locations corresponding to respective channel addresses, data associated with each of the plurality of data channels, the memory means including a current weight storing unit storing a current weight associated with each of the data channels and a step size storing unit storing a step size associated with each of the data channels, and processing means included into at least one of the pipeline stages, for processing at least data stored in the memory means at locations specified by the channel addresses, including adjusting means for incrementing or decrementing the current weight by the step size in accordance with an indicator indicating whether the channel power is to be increased or decreased.

The object of the invention is also solved by and apparatus for processing a plurality of data channels with unique channel addresses using a pipeline structure having plurality of pipeline stages, comprising addressing means for transmitting channel addresses between the pipeline stages, including time delay means associated with each of the pipeline stages, for time delaying the transmission of the channel addresses between pipeline stages, memory means included into at least one of the pipeline stages and connected to the addressing means, for storing, at a plurality of locations corresponding to respective channel addresses, data associated with each of the plurality of data channels, the memory means including a first storage unit for storing a current weight associated with each of the data channels and a second storage unit for storing accumulated channel weights associated with each of the data channels, and processing means included into at least one of the pipeline stages, for processing at least data stored in the memory means at locations specified by the channel addresses.

Still further, the object of the invention is solved by a method for processing a plurality of data channels with unique addresses using a pipeline structure having a plurality of pipeline stages and including addressing means for transmitting channel addresses between the pipeline stages, memory means for storing at a plurality of locations corresponding to respective channel addresses, data associated with the plurality of data channels, and processing means for processing at least channel specific data stored in the memory means at locations specified by the channel addresses, the method comprising the steps of: receiving a channel address of a data channel at a first pipeline stage via the addressing means, reading data associated with the channel address from the memory means, transmitting the read data and the channel address to a second pipeline stage, processing the data at the second pipeline stage, and forwarding the channel address and the processing result to a third pipeline stage.

The object of the invention is further solved by a method for processing a plurality of data channels with unique addresses using a pipeline structure having a plurality of pipeline stages and including addressing means for transmitting channel addresses between the pipeline stages, memory means for storing at a plurality of locations corresponding to respective channel addresses, data associated with the plurality of data channels, and processing means for processing at least channel specific data stored in the memory means at locations specified by the channel addresses, the method comprising the steps of: receiving a channel address of a data channel at a first pipeline stage via the addressing means, reading data associated with the channel address from the memory means, including a step size and a current weight associated with one of the data channels, transmitting the read data and the channel address to a second pipeline stage, processing the data at the second pipeline stage, including incrementing or decrementing the current weight by the step size, in accordance with an indicator indicating whether the power is to be increased or decreased, and forwarding the channel address and the processing result to a third pipeline stage.

Finally, the object of the invention is solved by a method for processing a plurality of data channels with unique addresses using a pipeline structure having a plurality of pipeline stages and including addressing means for transmitting channel addresses between the pipeline stages, memory means for storing at a plurality of locations corresponding to respective channel addresses, data associated with the plurality of data channels, and processing means for processing at least channel specific data stored in the memory means at locations specified by the channel addresses, the method comprising the steps of: receiving a channel address of a data channel at a first pipeline stage via the addressing means, reading data associated with the channel address from the memory means, including an accumulated channel weight and a current channel weight associated with one of the data channels, and transmitting the read data and the channel address to a second pipeline stage, processing the data at the second pipeline stage, including comparing two channel addresses subsequently transmitted via the addressing means, and performing an add operation on a value received from the first storage unit and a value received from the second storage unit using a current channel address in case of inequality of the two subsequent addresses and for performing an add operation on a previous output value of the adding circuit and a value received from the first storage unit in case of equality of the two subsequent addresses, and forwarding the channel address and the processing result to a third pipeline stage.

According to the invention, a plurality of pipeline stages for performing operations in each on clock cycle are provided with addressing means for transmitting channel addresses between pipeline stages, wherein the addressing means advantageously comprises time delay means associated with each of the pipeline stages for time delaying the transmission of the channel addresses between pipeline stages.

The inventive concept may, e.g., be applied to perform a weight adjustment and a power measurement on a plurality of data channels, for example, CDMA channels.

The invention advantageously allows to perform a pipeline type processing of data associated with the channels, e.g., channel weights of the plurality of data channels in an interleaved fashion. Each stage may retrieve data associated with the data channels from memory means using an address transmitted via the addressing means. Since the addresses are appropriately time delayed between subsequent stages in accordance with a time delay introduced while processing steps are performed on channel weights within respective pipeline stages. Thus, each stage will receive information regarding a particular channel for processing together with the correct channel address transmitted via the addressing means. Accordingly, a particular stage may advantageously process a channel weight from a first channel together with data associated with the first channel retrieve using an address received from the addressing means, a second pipeline stage may process a channel weight corresponding to a second channel together with data associated with the second channel received from the memory means using the address of the second data channel transmitted via the addressing means. The invention allows to advantageously use the fact that the power regulating period of a particular channel is much longer than the needed processing time.

The memory means may be comprised of a step size storing unit for storing a step size value associated with each of the data channels and may further comprise a current weight storing unit for storing a current weight associated with each of the data channel.- The processing means may include adjusting means for incrementally adjusting a current weight, i.e., incrementing or decrementing the current weight by the step size, thus advantageously allowing an approximation of the channel weight to the required power level.

The adapted current weights may be stored in the current weight storage unit using the appropriately delayed channel addresses.

Further, one of the pipeline stages may comprise a limit storage means for storing upper and/or lower weight limits corresponding to each of the plurality of channel addresses in case an adapted channel weight exceeds the upper or lower limit associated with a particular channel, the channel weight may be limited accordingly. Again, the correct address, corresponding to a channel weight subjected to limit computation, will be obtained from the addressing means, which appropriately delays the transmission of channel addresses. A limit operation may be performed only with an upper limit and/or a lower limit.

A step size setting unit may be provided for periodically updating the step sizes stored in the step size storage unit, or to give different channels different step sizes.

Advantageously, the invention further allows to compute average power values for the individual data channels by providing a first and second storage unit for storing current weights and accumulated weights associated with each of the data channels.

An address comparison circuit may be provided for comparing two channel addresses subsequently transmitted via the address means. An adding circuit may perform an add operation on a current weight received from the first storage unit and an accumulated weight received from the second storage unit using a current channel address in case of inequality of the two subsequent addresses and may perform an add operation on a previous output value of the add circuit and a current weight received from the first storage unit in case of equality of the two subsequent addresses. Thus, an accumulative power value may be obtained for a particular channel, even if two subsequent power values of this channel are processed according to the invention.

In case power weights of different data channels are transmitted sequentially and processed by the inventive pipeline structure, the current weight received from the first storage unit will be added to the accumulated weight received from the second storage unit.

The result of the add operation may advantageously be stored as a new accumulative power value in the first storage unit using the appropriately time delayed current address.

Advantageously, a channel spreading unit may be provided, arranged to spread the channel signals after channel power adjustment and/or a channel power measurement is performed, thus exploiting the fact, that spreading of a channel does not affect the power level.

In case the memory means allows simultaneous read and write operations, an accumulative power value of a channel may be stored in the memory means, while simultaneously an accumulative power value of another channel is retrieved from the memory means. Similarly, an adapted channel weight of a particular channel may be stored in the current weight storage unit while simultaneously a current weight of another channel is read from the current weight storage unit.

Further advantageous embodiments of the invention become obvious with further dependent claims.

BRIEF DESCRIPTION OF FIGURES

The invention will be best understood together with the accompanying drawings, in which:

FIG. 7 shows a flow chart illustrating the operation of the fourth embodiment of the invention.

DETAILED DESCRIPTION OF EMBODIMENTS

In the following, with respect to FIG. 1–7, preferred embodiments of the invention will be described.

Figure 1:
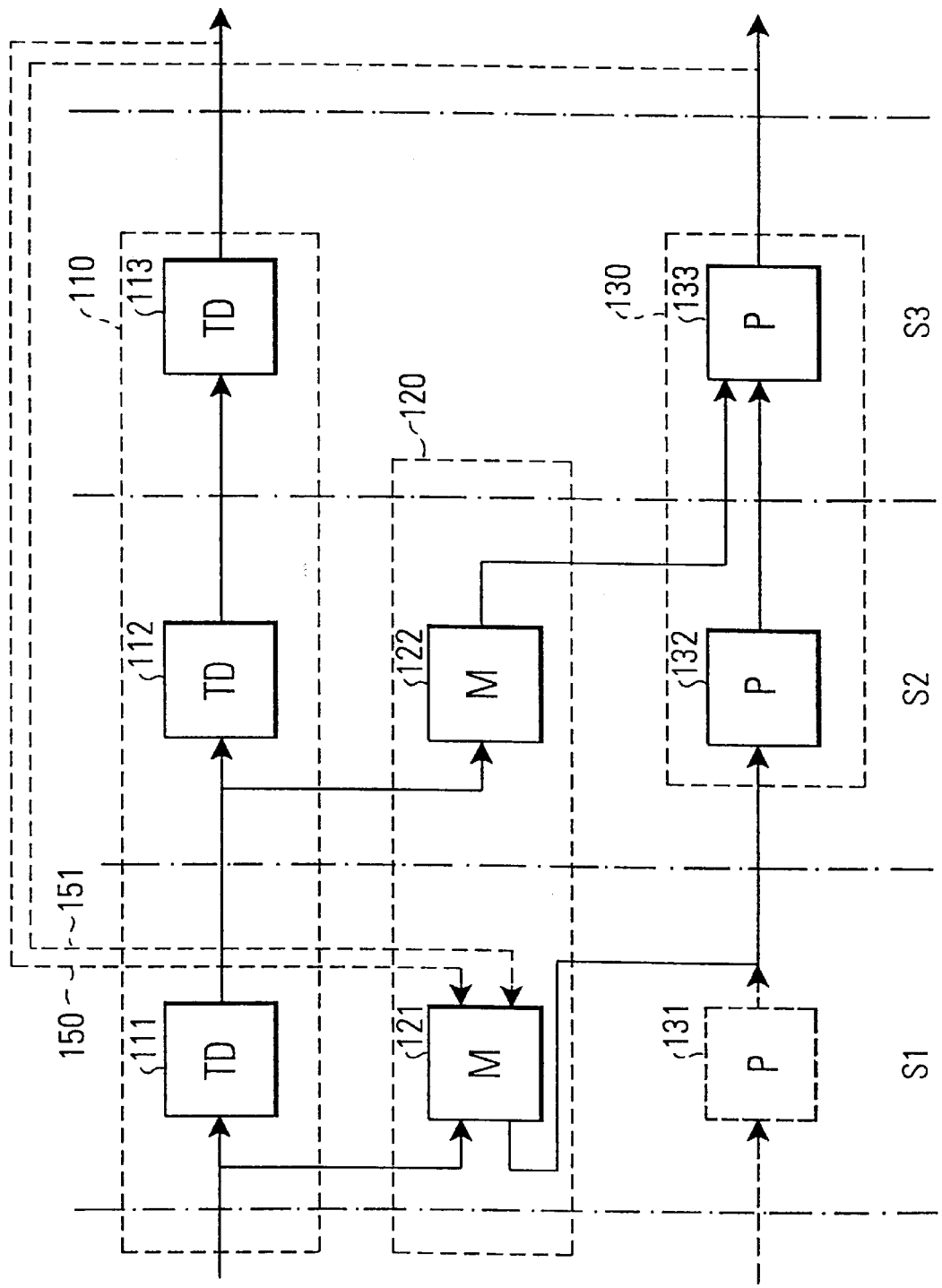
FIG. 1 shows a first embodiment the invention.

FIG. 1 shows a first embodiment of the invention for processing channel weights of a plurality of data channels having unique addresses using a pipeline structure.

The pipeline structure of FIG. 1 comprises three pipeline stages S1, S2 and S3, each of the pipeline stages including addressing means (110), for transmitting channel addresses between the pipeline stages. Further, time delay units (111, 112, 113) are associated with each of the pipeline stages, for time delaying the transmission of the channel addresses between the pipeline stages. The circuit further comprises memory means 120 associated with the first and second pipeline stages S1, S2, and connected to the addressing means, for storing, at a plurality of locations corresponding to respective channel addresses, data associated with each of the plurality of data channels. Further, the circuit comprises processing means 130 including processing units 132 and 133 associated with the pipeline stages S2 and S3, for processing the data associated with the channel addresses and the corresponding channel weights. Optionally, the first pipeline stage may also comprise a processing unit 131.

It is a key aspect of the invention that data channels with unique addresses may be operated on in a pipeline fashion in pipeline stages S1, S2, S3, while at each pipeline stage the address of a currently processed channel is available via addressing means 110. Hence, information specific for each particular data channel may be retrieved at the pipeline stages, e.g., from the memory means 120, using the respective channel addresses available at the pipeline stage via addressing means 110.

Obviously, each pipeline stage introduces a certain processing delay when processing data corresponding to a particular channel and thus, the transmission of data to be processed and the channel addresses between pipeline stages are synchronized using the delay means 111, 112, 113 for appropriately delaying the transmission of channel addresses between the pipeline stages. This assures that always the correct channel address is present at a particular stage, i.e., the channel address corresponding to a currently processed channel.

Accordingly, each of the pipeline stages S1, S2, S3 processes information regarding a particular channel and delays the corresponding channel address, and after processing hands over the channel address and the processing result to the subsequent one of the pipeline stages. Therefore, channel weights may be processed by the inventive circuit in an interleaved fashion, wherein each pipeline stage is provided with channel data and a corresponding channel address for performing operations. To allow the simultaneous transmission of channel data and channel address, e.g., hold circuits may be provided between the pipeline stages.

The inventive circuit may be applied to power control tasks and power measurement tasks in a CDMA telecommunications system.

In CDMA, since a large number of channels is to be power controlled and combined into a single communications signal, and since the power control interval for the weight adjustment and/or power measurement, which is to be performed on all individual communication channels individually, is longer than the actual power control operation necessary to adjust a channel power value, a large number of channels may be power controlled by a single hardware in an interleaved fashion. For example, power control information TPC (Transmission Power Control), i.e., an indicator indicating whether the signal power required for appropriate reception must be increased or decreased, may be received at a base station within a synchronization period of 32 $\mu$s. All operations regarding the weight adjustment and/or power measurement must be performed for all channels within this time period.

The apparatus allows to sequentially process weights of a plurality of data channels, the weights being specified by a sequence of channel addresses received at the addressing means 110. Corresponding channel weights and further channel data may be stored within the memory means 120 of FIG. 1 and/or may be received from the outside, e.g., the channel spreading unit or other components of a telecommunications system. E.g., if provided, the first processing unit 131 of the first pipeline stage S1 could receive current channel weights and/or other data from an external circuit, as shown in FIG. 1.

Processing results may be transmitted to further processing components, e.g., a power control unit of a CDMA telecommunications system, and/or may be stored within the memory means 120, as indicated by broken lines denoted 150, 151.

In CDMA, all channels are spread before combining them into a single signal. In a straight forward approach, a power measurement for each channel will be performed after spreading and before combining the channels. However, according to the invention, a power measurement is preferably executed before spreading, in order to be able to operate at lower data rates, exploiting the fact, that spreading does not affect the mean power of a communication channel signal. E.g., a power measurement could be performed on weights received from a power control circuit. In this case a significant processing gain can be achieved as compared to executing a power measurement and power control after spreading.

In the following, the components and operation of the embodiment of the invention shown in FIG. 1 will be described in detail.

The first pipeline stage S1 constitutes a stage of a first type and comprises a first memory unit 121 connected to the addressing means 110. The addressing means comprises a first delay unit 111, for delaying the transmission of channel addresses to the second pipeline stage S2, preferably such that at the second pipeline stage a processing result, memory data and the channel address, all associated with the same channel, are simultaneously received from the first pipeline stage. Further, the first pipeline stage S1 may comprise the processing unit 131 for receiving and processing channel data from the outside.

Similar to the first pipeline stage S1, the second pipeline stage S2, constituting a stage of an intermediate type, comprises addressing means 110 including a second delay unit 112, a second memory unit 122 connected to the addressing means, and a second processing unit 132. It is noted that a stage of the intermediate type does not necessarily have to comprise a processing unit and a memory unit, a stage of the intermediate type may also only comprise a processing unit or only a memory unit or several processing or memory units.

The third pipeline stage constitutes a pipeline stage of a final type, and comprises addressing means including a third delay unit 113, and a third processing unit 133. Since the third stage is the last stage, a memory unit may be omitted.

Even though the example of FIG. 1 is shown with only three stages, in general, an arbitrary number of stages may be provided, including stages of a first and a final type and any number of stages of the intermediate type. Further, in other embodiments, the memory means is included into at least one of the pipeline stages and connected to the addressing means and processing means is included into at least one of the pipeline stages.

A processing unit of a particular stage preferably receives data from a memory unit of a preceding stage, in order to minimize time delay, since in this case a processing delay at one stage may be used for retrieving channel specific data for a subsequent stage.

Addresses of data channels are transmitted via the addressing means 110 to the respective pipeline stages S1, S2 and S3.

The channel addresses at the stages S1, S2 and S3 are used to retrieve data from the memory units 121, 122 the data being associated with respective channels. The data associated with the data channels retrieved from the memory units will be transmitted to respective processing units 132 and 133 for processing.

Each stage of the pipeline structure will introduce a certain time delay when performing operations associated with the particular stage. Therefore, in order to assure that processing of information or a channel weight corresponding to a particular channel always corresponds to an address transmitted to the respective pipeline stages via the addressing means 110, the same time delay has to be introduced for the transmission of the channel addresses. Therefore, the addressing means preferably comprises the delay means 111, 112 and 113, each one time delay unit associated with each one of the pipeline stages for time delaying the transmission of the channel address between pipeline stages by the time needed for performing operations within that stage. For example, this time delay may be a uniform time delay of one clock cycle per stage.

For example, if in a first clock cycle information or a channel weight corresponding to a first channel is operated on at the first pipeline stage S1, the operation result will be transmitted to the second pipeline stage S2 with a time delay of, e.g., one clock cycle. Then, in order to simultaneously receive channel data and channel address at the second pipeline stage, the time delay means will have to introduce the same time delay, e.g., one clock cycle, for the transmission of the first channel address from the first pipeline stage S1 to the second pipeline stage S2.

The memory means 120 will preferably be used to store data associated with the plurality of channels at locations which may be addressed using the addresses transmitted via the addressing means. Thus, the memory means 120 is addressable using the addresses transmitted via the addressing means 110.

Data corresponding to a data channel, retrieved via an address transmitted via the addressing means, will preferably be transmitted to the processing means 130 for processing. This processing may be include any type of mathematical or logical operation, as it is known in the art. At the same time, the address transmitted via the addressing means will be time delayed and then, simultaneously with the data retrieved from the memory means 120, be transmitted to the second stage S2 comprising the processing means 130. After performing operations at the second pipeline stage S2, the processing result, corresponding to a particular one of the data channels, may be forwarded to the third stage S3 and/or may be written back into the memory means 120, using the appropriately time delayed channel address transmitted via the addressing means 110.

A processing result of the last pipeline stage and the corresponding channel address may be output for further processing and/or may be written into memory means 120, using the address, as illustrated by broken lines 150, 151. A processing result may, e.g., be written into the first memory unit 121 of the first pipeline stage S1 such that the processing result of a weight processing iteration is available for a subsequent weight processing iteration. In this case, memory unit 121 will preferably allow a simultaneous read and write operation, such that a processing result regarding a first channel may be written into the memory unit while at the same time another channel may be operated on at the first pipeline stage.

In the following, operations of the inventive circuit according to FIG. 1 will be outlined with respect to an example.

It be assumed that the data channels C1, C2, C3, C4 are present. It further be assumed that each of the pipeline stages S1, S2, S3 performs operations within first to sixth clock cycles T1, T2, T3, T4, T5 and T6.

In this case operations of the inventive circuit may be as shown in Table 1.

TABLE 1

| | Stage | | |
|---|---|---|---|
| cycle | S1 | S2 | S3 |
| T1 | C1,A1 | XXXXX | XXXXX |
| T2 | C2,A2 | C1,A1 | XXXXX |
| T3 | C3,A3 | C2,A2 | C1,A1 |
| T4 | C4,A4 (C1,A1) | C3,A3 | C2,A2 |
| T5 | C1,A1 (C2,A2) | C4,A4 | C3,A3 |
| T6 | C2,A2 (C3,A3) | C1,A1 | C4,A4 |

Accordingly, in a first operation within a clock cycle T1 at the first pipeline stage S1, a channel weight of the first data channel C1 is processed. At this time, the address A1 of the first data channel C1 is available at the first pipeline stage. In the present example, operations within clock cycle T1 at stage S1 include retrieving channel specific data, e.g. a channel weight from the first memory unit 121. Alternatively, the first stage S1 may also process information received from external components in processing unit 131.

After operations at the first pipeline stage S1, data associated with the first channel retrieved from the first memory unit 121, will be forwarded to the second pipeline stage S2. At the same time, the appropriately time delayed first channel address A1 is transmitted to the second pipeline stage S2. At the second pipeline stage S2, data associated with the first channel, e.g., retrieved from the first memory unit 121 are processed in the second processing unit 132, and channel specific data associated with the first channel are retrieved from the second memory unit 122 using the first channel address A1.

After operations at the second pipeline stage S2, the processing result from the second processing unit 132, data retrieved from the second memory unit 122 and the appropriately time delayed first channel address A1 are transmitted to the third pipeline stage S3.

At the third pipeline stage S3, in a clock cycle T3, data retrieved from the second memory unit 122 may be processed in the processing unit 133 together with a processing result received from the second processing unit 132.

In the fourth clock cycle T4, as indicated in brackets, the processing result from the third pipeline stage S3 may be output to external devices, e.g., to a power measurement device, together with the appropriately time delayed first channel address A1, or may be stored in the first memory unit 121, as indicated by broken arrows. Since the processing result from the third processing unit 133 corresponds to the first channel C1 and the address output from the third delay unit 113 is the channel address A1, this channel address A1 may be used to write the processing result from the third processing unit 133 into the first memory unit 121 as shown in FIG. 1. Preferably, the memory means 120 allows simultaneous read and write operations for allowing storing, in the memory means, a value corresponding to the current channel address simultaneously with reading a value corresponding to another channel address.

Simultaneously to the write operation, at the fourth clock cycle T4, another channel may be operated on at the first pipeline stage.

The above described course of operations for processing a channel weight of the first data channel C1 applies to all four data channels, each channel delayed by one clock cycle such that in an interleaved fashion, all channels will be processed by the pipeline stages.

It is noted that in general an arbitrary number of channels with an arbitrary number of stages may be processed according to the above scheme.

As outlined above, the inventive circuit may be used for a variety of tasks in processing channel weights for a plurality of data channels, for example, the inventive circuit may be used for adjusting channel weights for individually setting a desired power value for each of the plurality of data channels. Further, the inventive circuit may be used to obtain channel power measurements.

The data channels may be channels of a CDMA telecommunications system and the channel weights may determine the amplitudes of the data channels before combining the data channels into a CDMA signal for transmission.

In the following, with respect to FIG. 2, a second embodiment of the invention will be described. In this example, the inventive circuit is used for adjusting channel weights for controlling the power level of a plurality of data channels of a telecommunications system.

For example, the inventive circuit may be applied to a CDMA telecommunications system, where, as outlined in the introductory portion of the application, each data channel needs to be individually power controlled. Since the power control interval is longer than the actual power control operation necessary to adjust a channel power value, e.g. in accordance with a TPC (Transmission Power Control) bit received from a mobile telephone, a plurality of channels may be power controlled by a single hardware executing respective power control operations in an interleaved fashion, as outlined before.

Figure 2:
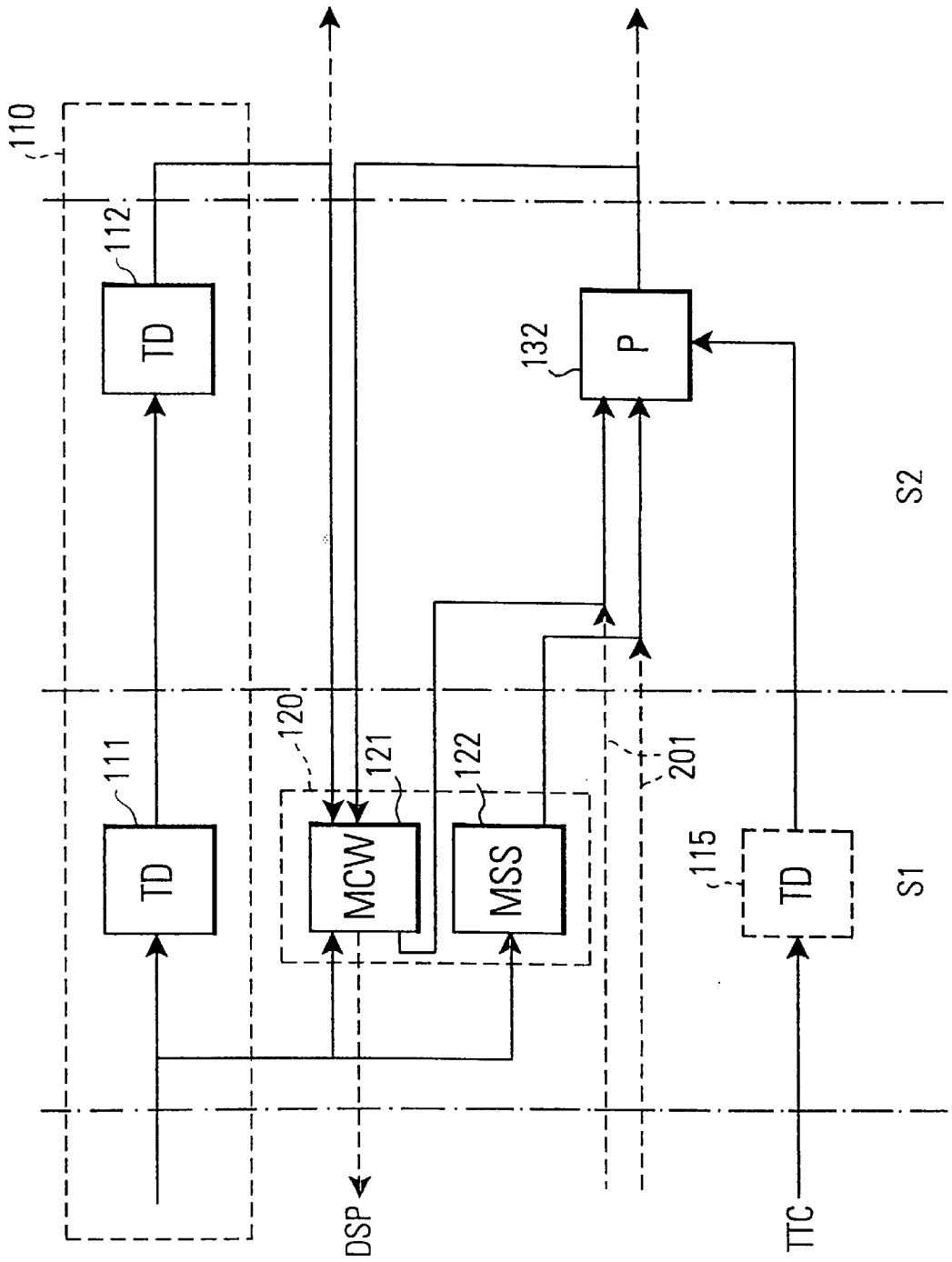
FIG. 2 shows a second embodiment the invention.

The apparatus of FIG. 2 includes two pipeline stages S1, S2 for adjusting the plurality of channel weights, for example, depending on TPC data, e.g., indicators received from other components of the system.

Further, in FIG. 2 address means 110 are shown, including a first time delay unit 111 associated with a first pipeline stage S1, and a second time delay unit 112 associated with a second pipeline stage S2. Again, the addressing means together with the delay units allows for an appropriate transmission of channel addresses between the pipeline stages, in order to assure that channel data processed by a particular pipeline stage always correspond to the address available at the particular pipeline stage. Moreover, the circuit of FIG. 2 comprises memory means 120, associated with the first pipeline stage S1, as well as a processing unit 132 associated with the second pipeline stage S2. The processing unit is supplied with indicators, e.g., TPC data, for indicating, whether the channel weight of a particular channel is to be increased or decreased. The TPC data may be appropriately time delayed in stage S1 by a time delay unit 115.

As in the first embodiment, a sequence of channel addresses will be received at the first pipeline stage S1. The channel address will used to retrieve channel specific data from the memory means 120, i.e., a channel weight corresponding to the received channel address. Subsequently, the retrieved channel specific data will be forwarded to the second pipeline stage S2, together with the corresponding appropriately time delayed channel address.

At the second pipeline stage, a processing unit 132 will process the channel specific data, preferably in accordance with the TPC information, and further at the second pipeline stage S2, the received channel address will be time delayed, in correspondence with the processing delay introduced in the processing unit 132.

Thereafter, the processing result from the processing means 132 together with the channel address will be transferred back to the first pipeline stage S1, where the processing result is written into the memory means 120 (unit 121) using the channel address. Preferably, the memory means 120 may allow a simultaneous read and write operation, in order to allow a simultaneous writing of processing results associated with a first channel and reading of channel data associated with a second channel at the first pipeline stage S1.

In order to facilitate a weight adjustment for the plurality of data channels, the memory means 120 comprises a current weight storing unit 121 for storing a current weight associated with each of the data channels, and further comprises a step size storing unit 122, for storing an adjustment step size associated with each of the data channels for incrementing or decrementing the current weights of the channels. For example, the step sizes may be 0,25 dB, 0,5 dB etc.

During operations, from time to time the step size associated with each of the channels will preferably be updated in the step size storing unit 122, in accordance with transmission characteristics or power levels needed for a proper transmission to respective receiving stations. For example, some short distance connections may need smaller adjustment step sizes than connections over longer distances. E.g., the step sizes may be adjusted depending on the magnitude of a currently processed weight.

The updating of step sizes may be performed within a synchronization period of, e.g., 32 μs. In accordance thereto, the power control, i.e., the weight adjustment for the plurality of data channels is to be performed within the synchronization time period.

For adapting channel weights, the processing unit 132 may include adapting means for adapting a current weight of a data channel, retrieved from the memory means using a current channel address, in accordance with the corresponding step size, e.g., by incrementing or decrementing the current weight in steps determined by the step size. In this case the indicator, e.g., the TPC value, received at the processing unit 132 preferably determines whether the current weight is to be increased or decreased, i.e., whether the channel power is too low or too high. For example, in case the indicator corresponds to (+), the current weight will be incremented, and the incremented current weight value will be output by the processing unit 132. In case the indicator corresponds to (−), the current weight will be decremented and output by the processing unit.

The incremented or decremented current weight output by the processing unit 132 will belong to the channel having the address output by the second time delay unit 112. Therefore, the output address may be used to store the adapted weight in the current weight storage unit 121.

Hence, in accordance with the adaptation process, adapted current weights of each of the plurality of data channels are stored in the current weight storage unit 121, and may, in certain intervals, be read out from the current weight storage unit by a DSP circuit for further processing, as indicated in FIG. 2. For example, the current weights read out from the current weight storage unit may be transmitted to a weighting unit for setting the power levels of the individual data channels before combining them into the transmission signal. Thus, the output from processing unit 132 and the address from delay unit 112 may directly be used for setting a current weight.

Further, the DSP circuit may supply values for current weights, e.g., reference values, to be stored in the memory means.

The time delay units 111, 112 of addressing means 110 may, for example, be constituted by flip flops, for holding address values for a predetermined time period. This time period may be a clock cycle of an internal clock for operating the pipeline circuit. In this case, for each clock cycle, operations will be performed on a particular data channel in each of the pipeline stages. At the end of the clock cycle, operation results will be output from each particular pipeline stage together with the appropriately latched channel addresses and forwarded to the subsequent pipeline stage.

In an alternative embodiment, current weights and/or step sizes may be received from the outside, as it is indicated with an arrow denoted 201.

In the following, with respect to the flow chart of FIG. 3, operations of the circuit according to FIG. 2 will be described. Since the inventive circuit may be used to process channel weights in an interleaved fashion, each of the individual pipeline stages may operate on data regarding different data channels. Further, in case simultaneous read and write operations are enabled at the memory means 120, a simultaneous reading of data from the memory means and writing of data into the memory means may be performed at pipeline stage S1.

At the beginning of operations, in a step 301 a channel address is received via addressing means 110. This channel address is transmitted to the current weight storage unit 121 and the step size storage unit 122. At the current weight and step size storage units, in a step 302, a current weight and a step size value is read from memory locations addressed using the channel address. Further, the channel address is appropriately time delayed.

In a step 303 the current weight, the step size value and the delayed channel address are transmitted to the second pipeline stage S2. At the second stage, in a step 304, an indicator, e.g., a TPC value, corresponding to the currently processed channel is obtained. It is noted that in further embodiments the TPC value may be received via a delay unit from the first pipeline stage. This indicator may correspond to (+) or (-), indicating whether the current weight is to be increased or decreased by the step size. The indicator may be obtained from the first stage S1, where it was time delayed, in order to maintain the correspondence of the channel to be controlled and the corresponding TPC value.

In a step 305 it is determined whether the indicator or TPC value corresponds to (+). In case it does in a step 306 the current weight is increased by the fixed or variable step size, as outlined before (CW=CW-SS). In case the indicator or TPC value does not correspond to (+), in a step 307, the current weight is decreased by the fixed or variable step size (CW=CW-SS). This completes operations for a particular channel at the second pipeline stage S2.

Further, a valid signal TPC_VAL may indicate whether a channel weight is to be maintained unaltered.

In a step 308, the channel address is delayed, and then, the delayed channel address and the current weight are transmitted to the first pipeline stage S1.

In a step 309, again at the first pipeline stage S1, the output current weight is written back to the current weight storage unit 121, using the delayed current channel address for addressing the current weight storage unit. After performing the write operation in step 309, the process flow returns to step 301.

As outlined before, the pipeline arrangement according to the invention processes channel weights in an interleaved fashion, such that simultaneously with operations at the second pipeline stage S2 concerning a first channel, a second data channel may be operated on by the first pipeline stage S1. Further, in case a simultaneous read and write operation is possible at the memory means 120, pipeline stage S1 may simultaneously perform a read operation concerning a step size and current weight related to the second channel, while performing a write operation related to a current weight of the first channel in step 309.

The course of operations is also illustrated in Table 2, showing the adaptation of channel weights of 3 data channels C1, C2 and C3 for seven clock cycles T1–T7.

TABLE 2

| | stage | |
| Cycle | S1 | S2 |
| --- | --- | --- |
| T1 | C1 | |
| T2 | C2 | C1 |
| T3 | C3 (C1) | C2 |
| T4 | C1 (C2) | C3 |
| T5 | C2 (C3) | C1 |
| T6 | C3 (C1) | C2 |
| T7 | C1 (C2) | C3 |

As illustrated in table 2, during the first clock cycle T1, at the first pipeline stage S1, the first channel C1 is operated on. Subsequently, during the second clock cycle T2 at the second pipeline stage S2, operation results of stage S1 associated with the first channel C1 are processed. Simultaneously, during the second clock cycle T2 the first pipeline stage S1 operates on a second data channel C2.

Next, during a third clock cycle T3, at the first pipeline stage S1, the third data channel C3 is operated on. Simultaneously, at the first pipeline stage S1, data regarding the first data channel C1 may be written back into the memory means, as indicated by (C1). Further, during the third clock cycle T3, at the second pipeline stage S2, the second data channel C2 is operated on.

Subsequently, operations start again with the first data channel C1, or may continue with even more channels. It is noted that the steps of FIG. 3 not necessarily have to be executed strictly in the indicated order, variations of the order, especially within a particular stage, are possible.

In the following, with respect to FIG. 4, a third embodiment of the invention will be described. The embodiment of FIG. 4 also constitutes an application of the inventive circuit to adjusting weights of a plurality of data channels, e.g. in a CDMA telecommunications system.

Figure 3:
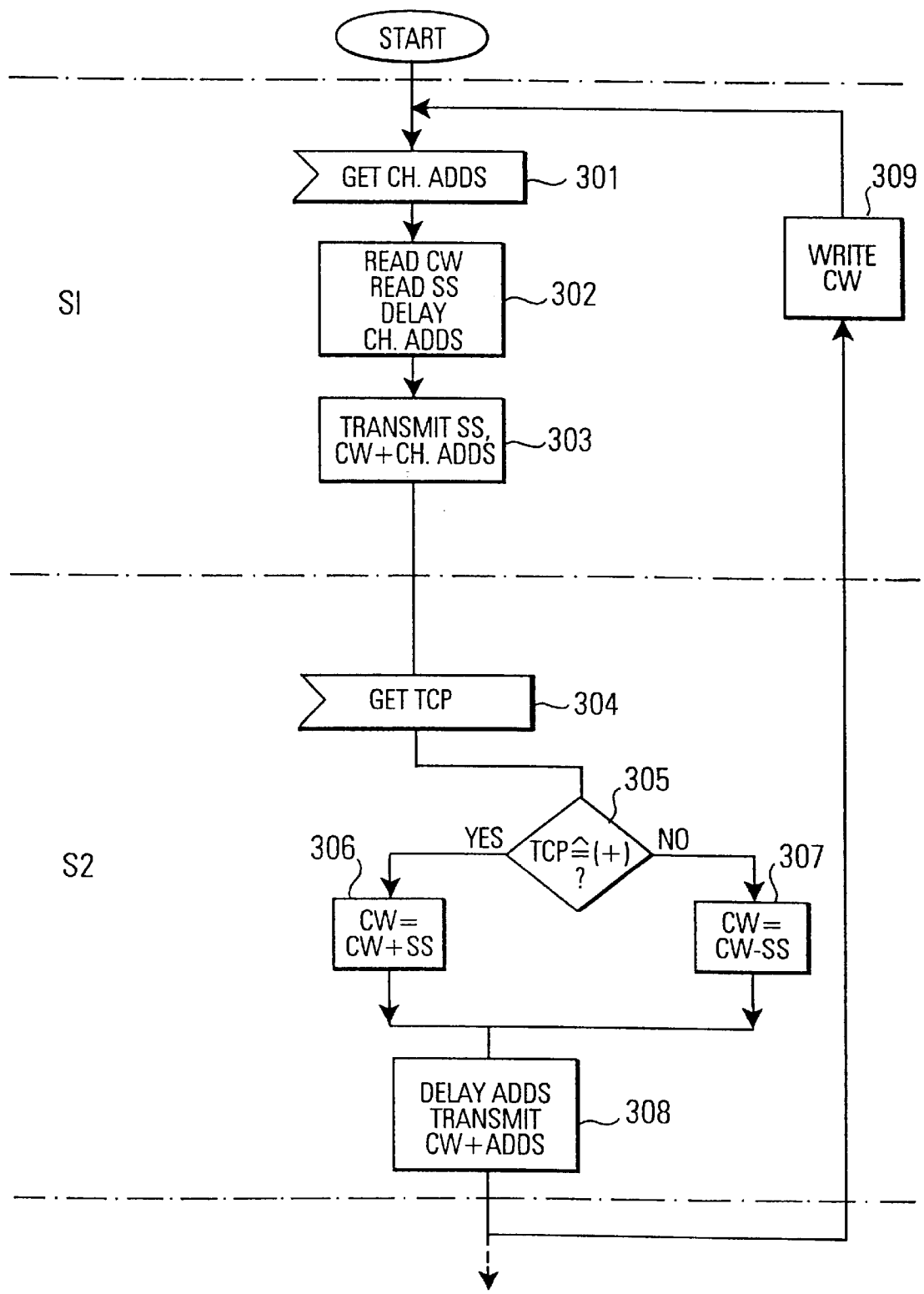
FIG. 3 shows a flow chart illustrating the operation of the apparatus according to FIG. 2.
Figure 4:
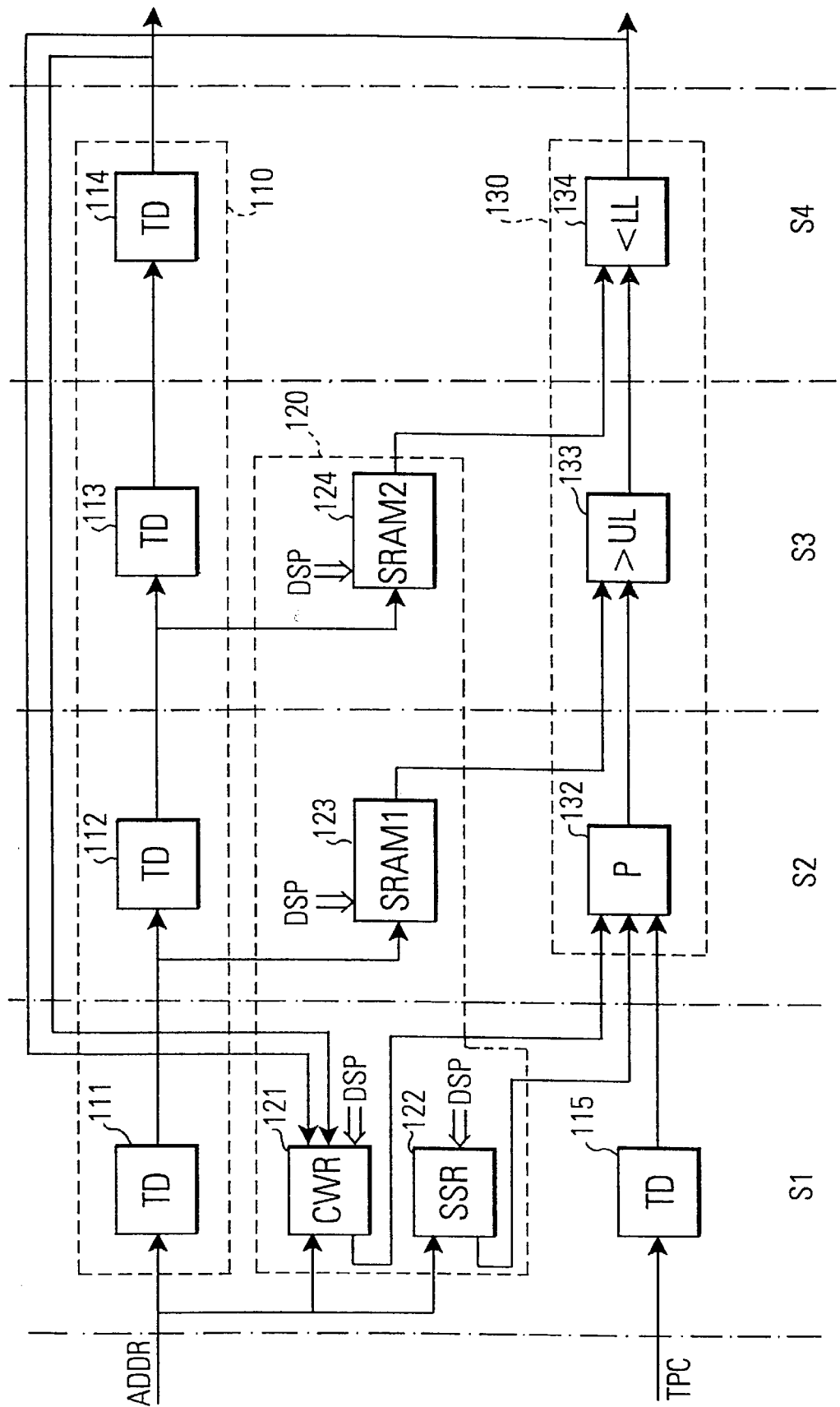
FIG. 4 shows a third embodiment of the invention.

The circuit of FIG. 4 comprises 4 pipeline stages S1, S2, S3 and S4. As before, it further comprises addressing means 110, memory means 120 and processing means 130. Similarly to the second embodiment described with respect to FIG. 2 and 3, the first pipeline stage of the embodiment of FIG. 4 comprises a current weight storage unit 121 and a step size storage unit 122. Further, step sizes corresponding to the plurality of channels, stored within the step size storage unit 122 and respective locations identified by the channel addresses, may be updated in a synchronization period.

Each of the pipeline stages S1–S4 comprises a time delay unit 111, 112, 113, 114 for appropriately time delaying the transmission of channel addresses between the pipeline stages.

Differing from the previous embodiment, the third embodiment according to FIG. 4 comprises a first limit storage unit 123 and a second limit storage unit 124 for storing upper and lower weight limits corresponding to each of the plurality of channels, addressable by the plurality of channel addresses. The first limit storage unit 123 is associated with the second pipeline stage S2, the second limit storage unit 124 is associated with the third pipeline stage S3. In accordance with addresses transmitted via the addressing means, limit values corresponding to data channels are retrieved from first and second limit storage units 123, 124 and are transmitted to the subsequent pipeline stage.

Further, the second pipeline stage S2 comprises processing means 132, and the third pipeline stage S3 comprises an upper limit decision means 133 and the fourth pipeline stage S4 comprises a lower limit decision means 134. The adjusting means is supplied with a current weight, a step size and an indicator or TPC value, whether the current weight is to be increased or decreased. A time delay unit 115 is provided in stage S1 for appropriately time delaying a TPC value corresponding to a currently processed channel before the TPC value is forwarded to a processing means 132 of stage S2.

The decision means are used to compare an adjusted current weight, received from the processing means 132, with an upper and lower weight limit received from the first and second limit value storage units 123, 124. Preferably the decision means thus receive a current weight of a channel and weight limits according to the corresponding channel addresses and decide, whether the channel weight exceeds the weight limits and correspondingly limit the channel weights. For example, if a current weight exceeds an upper limit associated with the corresponding channel, the limit value may be transmitted for further processing. Similarly, if the current weight is lower than a lower weight limit corresponding to the data channel, the lower limit value may be transmitted for further processing. Thus, the upper and lower limit decision units 133, 134 act as delimiting circuits for setting a maximum or minimum weight value for each data channel, in accordance with weight limits retrieved from the upper and lower limit value storage units 123, 124, in accordance with addresses transmitted via the addressing means 110.

As in the second embodiment, in this embodiment the current weight output from the fourth pipeline stage S4 may be written back to the current weight storage unit 121 of the first pipeline stage S1, using the corresponding channel address output from the fourth delay unit 114.

As indicated before, power control and measurement is advantageously executed before spreading. Accordingly, the output may be forwarded to a circuit for measuring the power of the channels, which may also be constituted by the pipeline circuit of the invention, as described before. Further, the output may be forwarded to a power weighting circuit and channel spreading unit.

Again, it is preferred that a simultaneous read and write operation may be performed at the current weight storage unit 121, in order to simultaneously retrieve a current weight concerning a second channel and to write a current weight associated with a first data channel.

It is noted that the limits may be set or adjusted via a DSP circuit.

The third embodiment allows to adapt a channel weight in essentially 5 steps, as follows:

1. retrieving a current weight and a step size from the current weight storage unit 121 and the step size storage unit 122,
2. adjusting the current weight using an adjusting unit 132, in accordance with the TPC value and the step size, and retrieving an upper weight limit from the first limit value storage unit 123,
3. comparing the upper limit with the adapted current weight (with the incremented or decremented current weight), delimiting the adapted current weight appropriately, and reading a lower limit from the second limit storage unit 124,
4. comparing the adapted current weight with the lower limit retrieved from the second limit storage unit 124 in the fourth processing unit 134 and delimiting the adapted current weight appropriately,
5. writing the appropriately adapted and delimited current weight into the current weight storage unit 121 of the first pipeline stage S1 using the appropriately time delayed channel address provided by the addressing means 110.

Figure 5:
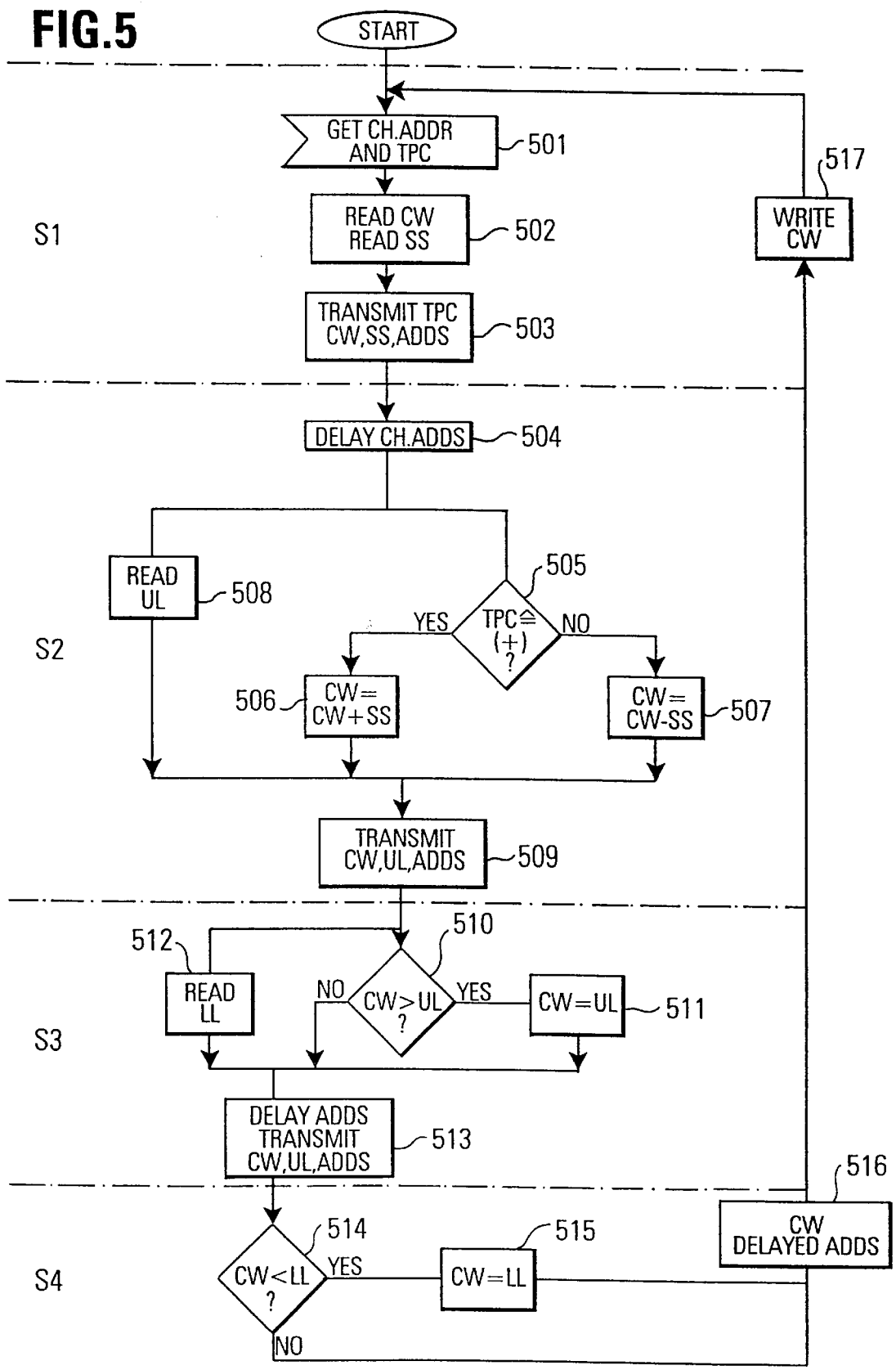
FIG. 5 shows a flow chart for illustrating the operation of the third embodiment of the invention.

In the following, operations of the third embodiment of the invention will be outlined in detail with respect to the flow diagram of FIG. 5.

At the beginning of operations, at the first pipeline stage S1 in a step 501, a channel address is obtained from the addressing means 110. The obtained address is forwarded to the memory means 120, to the current weight storage unit 121 and the step size storage unit 122. A TPC value for the channel to be processed is retrieved at the time delay unit 115. In step 502, a corresponding current weight and a corresponding step size are read. The current weight, the step size and the TPC value are then transmitted together with the appropriately time delayed channel address to the second pipeline stage S2 in a step 503.

At the second pipeline stage S2, the channel address is appropriately delayed in a step 504. Then, the current weight is adjusted according to the TPC information. In a step 505, it is determined whether the TPC value corresponds to (+), and in case it does, in a step 506, the current weight is increased by the step size, as outlined before (CW=CW+ SS). In case the indicator or TPC value does not correspond to (+), in a step 507, the current weight is decreased by the step size (CW=CW−SS).

Further, in a step 508 an upper weight limit UL is read from the first weight limit storage unit 123 using the channel address received from the first pipeline stage S1. Finally, in step 509, the appropriately adapted current weight (steps 505, 506 and 507), the read upper weight limit (step 508) and the appropriately delayed channel address are transmitted to the third pipeline stage S3.

At the third pipeline stage, in a step 510, it is determined whether the current weight is larger than the upper limit. If yes, in a step 511 the current weight is set to the upper limit. Otherwise, the value is not changed. In a step 512, using the channel address received from the second pipeline stage S2, a lower weight limit corresponding to the channel is read from the second weight limit storage unit 124.

Finally, in a last step 513 at the third pipeline stage S3, the lower weight limit corresponding to the channel, the appropriately adapted and delimited current weight and the (again appropriately) delayed channel address are transmitted to the fourth pipeline stage S4.

At the fourth pipeline stage, in a step 514, it is determined whether the current weight is smaller than the lower weight limit. If yes, the current weight is set to the lower weight limit in a step 515. Subsequently, the appropriately adapted current weight (steps 505–507), which may have been appropriately delimited (steps 511, 515), will be forwarded to the first pipeline stage S1, together with the appropriately time delayed channel address in a step 516. At the first pipeline stage S1, in a step 517, using the delayed channel address, the appropriately adapted and/or delimited current weight is written into the current weight storage unit 121. Following, the flow returns to step 501.

During operations, a channel weight is not necessarily updated for each arriving signal element (data symbol) transmitted via the channel. Generally, a channel weight will be updated each time a TPC value is received, which may be, e.g., every 20, 40, 80, 160 . . . symbols.

It is noted that the steps of FIG. 3 not necessarily have to be executed strictly in the indicated order, variations of the order, especially within a particular stage, are possible.

In the following, with respect to FIG. 6 a fourth embodiment of the invention will be described. It was outlined before, that the invention may be applied to various tasks in processing channel weights of a plurality of data channels, e.g. data channels of a CDMA telecommunications system. In the following, with respect to FIG. 6, it will be described how the invention may be applied to an interleaved channel power measurement. A channel power measurement is necessary in order to obtain information about the channel power of a particular communication channel. Since in the CDMA system a plurality of individual data channels in power controlled independently, a power measurement is needed for each of the plurality of data channels, and, in order to advantageously use the lower bit rate before spreading, is executed before spreading takes place. Since spreading does not affect the average power, the obtained power values are valid for the spread communication signals, too.

Figure 6:
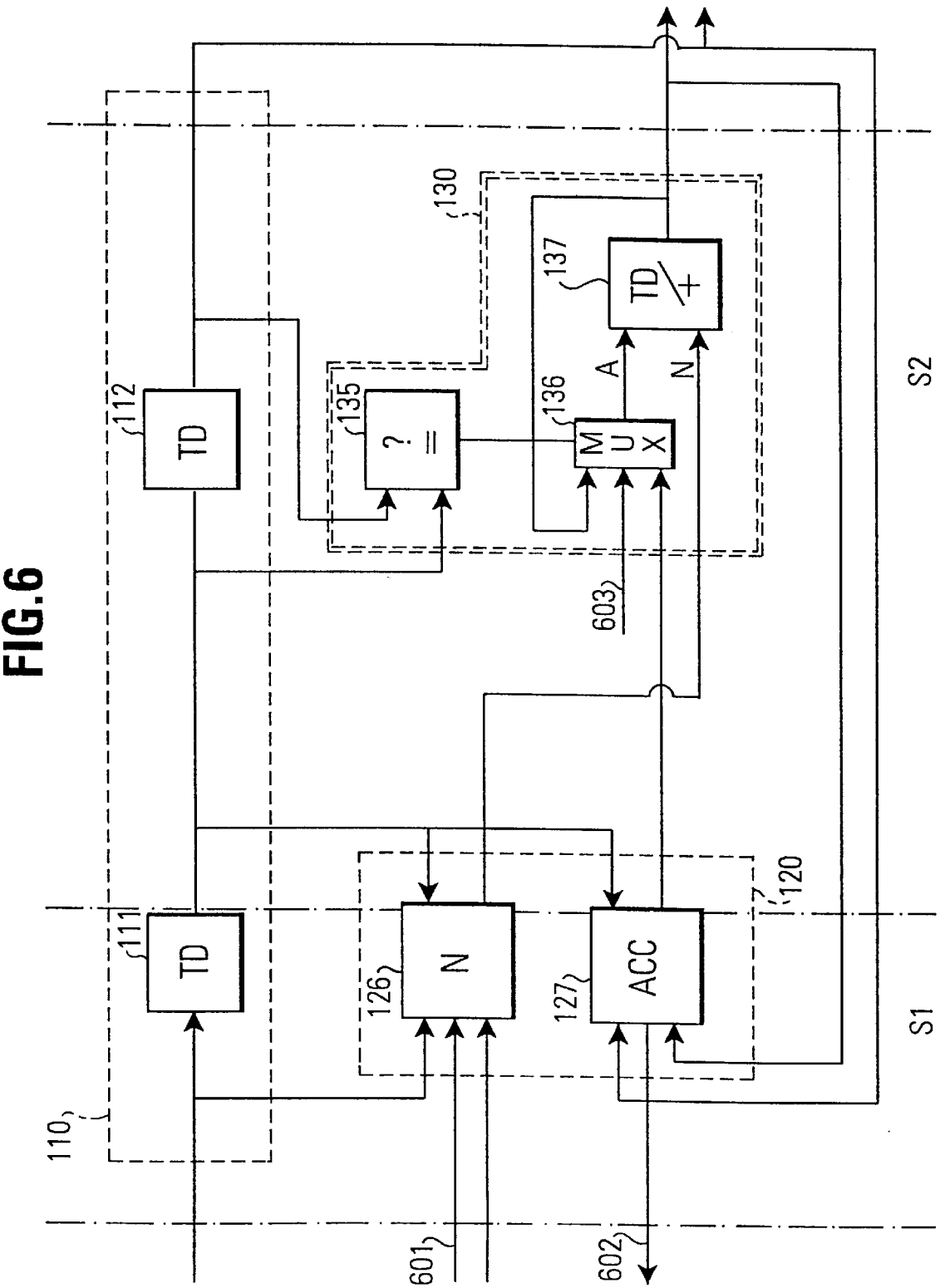
FIG. 6 shows a fourth embodiment of the invention.

In the embodiment of the FIG. 6 the channel power of a data channel is estimated by successively accumulating channel weights or channel power values over a certain period of time. For each data channel, a final accumulation result will be determined, which can be used to estimate the mean channel power over the particular period of time used for the accumulation. The accumulated average power value may be read out at the end of a power measurement interval.

The fourth embodiment of FIG. 6 comprises 2 pipeline stages S1 and S2 and, as the previous embodiments, comprises addressing means 110, memory means 120 and processing means 130. The memory means 120 is associated with the first and second pipeline stage S1 and S2 and comprises a first storage unit 126 for storing a current weight associated with each of the data channels and further comprises a second storage unit 127 for storing accumulated channel weights associated with each of the data channels. As before, information in the memory means associated with the particular channels may be stored or retrieved using the unique channel addresses of the data channels. New current channel weights in accordance with the channel address are provided to the first storage unit 126 within a specific update time period, e.g., from a power control circuit, as indicated by an arrow denoted 601. Final accumulation results may be read out from the second storage unit 127 in predetermined time instants, as indicated by an arrow denoted 602. For this purpose, the first and second storage unit 126 and 127 preferably are dual port RAMs for simultaneous read and write operations.

For facilitating the read out of accumulated values, a take over memory may be provided.

The memory means is connected to the addressing means 110, for receiving a channel address, delayed by time delay unit 111, and causing a readout operation of a new current weight from the first storage unit 126 and of a previously stored accumulation result from the second storage unit 127. Alternatively, new channel weights may be directly transmitted from outside sources.

The second pipeline stage S2 includes processing means 130, comprising a comparison circuit 135 for comparing subsequently transmitted addresses for determining equality, and a multiplexer 136 and an adder 137. The multiplexer 136, the adder 137 together with the comparison circuit 135 allow to either add a new channel weight from the first storage unit 126 and an intermediate accumulation result from the second storage unit 127, both corresponding to a particular data channel, or alternatively, allows to add a new channel weight 126 and a previous output value of the adder 132, depending on an equality or inequality of two subsequent channel addresses. In case of an equality of two sequentially transmitted addresses, a corresponding indicator is transmitted to the multiplexer for this purpose, allowing a selection of an intermediate result.

Specifically, in case of an equality of subsequent channel addresses, an output value of the adder is fed back to the input of the adder and is added to a new current channel weight corresponding to the same channel. In case of inequality of 2 subsequent addresses, a previous accumulation result stored in the second storage unit 127 and the current weight are added. The output of the processing means 130, may be written back into the second storage unit 127 as an intermediate accumulation result. For this write operation the appropriately time delayed channel address is used, as outlined before.

After a channel power measurement period, a final accumulation result corresponding to a particular channel may be read from a buffer (not shown) for further processing. At that point in time a reset signal is provided to the multiplexer, allowing a reset of the accumulation result of the second storage unit.

Advantageously, a channel spreading unit may be provided (not shown), arranged for spreading the individual channels after a channel power adjustment and/or a channel power measurement. Spreading does not change the average power. Therefore, a power measurement may be executed at a far lower rate before spreading takes place, which in turn means a large processing gain.

In the following, with respect to FIG. 7, operations of the fourth embodiment according to FIG. 6 will be described. The flow chart illustrates operations performed at a first pipeline stage S1 and a second pipeline stage S2.

At the beginning of operations, in a step 701, a channel address and a current weight, e.g., from a channel power control circuit is received from the addressing means 110. The channel address is forwarded to the first storage unit 126 and, in a step 702, the current weight is written to the first storage unit.

Following, in a step 703, the delayed channel address is transmitted to the second stage S2.

At the second stage, in a step 704 an intermediate accumulation result ACC and a new current weight N are read out from the storage units 126 and 127. Then, in a step 705 it is determined at the processing unit 135, whether the current channel address is equal to the previous channel address. In case the previous address and the current address are equal, in step 706, the multiplexer will supply the previous accumulation result to the adder as a value A (A !=previous accumulation result via feedback line from the adder). If it is determined that the current address is not equal to the previous channel address, in a step 707, a previous accumulation result from memory means 127 corresponding to the new address is supplied to the adder 137 as value A (A !=ACC). In a step 708 value A and the new current weight N are added.

In the following, in a step 709, the obtained value (steps 706, 707, 708) is transferred to the first pipeline stage SI and is written into the second storage unit 127 in a step 710, using the appropriately time delayed channel address. In the following, the flow returns to step 701.

Read and write operations may be performed simultaneously, as outlined with respect to previous embodiments.

It is noted that the steps of FIG. 3 not necessarily have to be executed strictly in the indicated order, variations of the order, especially within a particular stage, are possible.

Figure 8B:
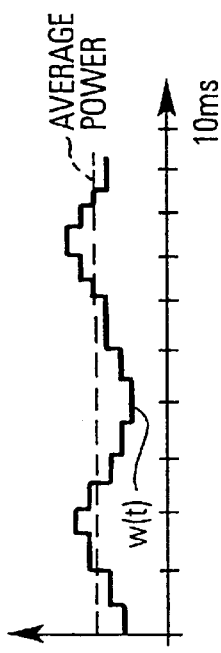
FIG. 8b shows an example of an adapted weight and an average power value.
Figure 8A:
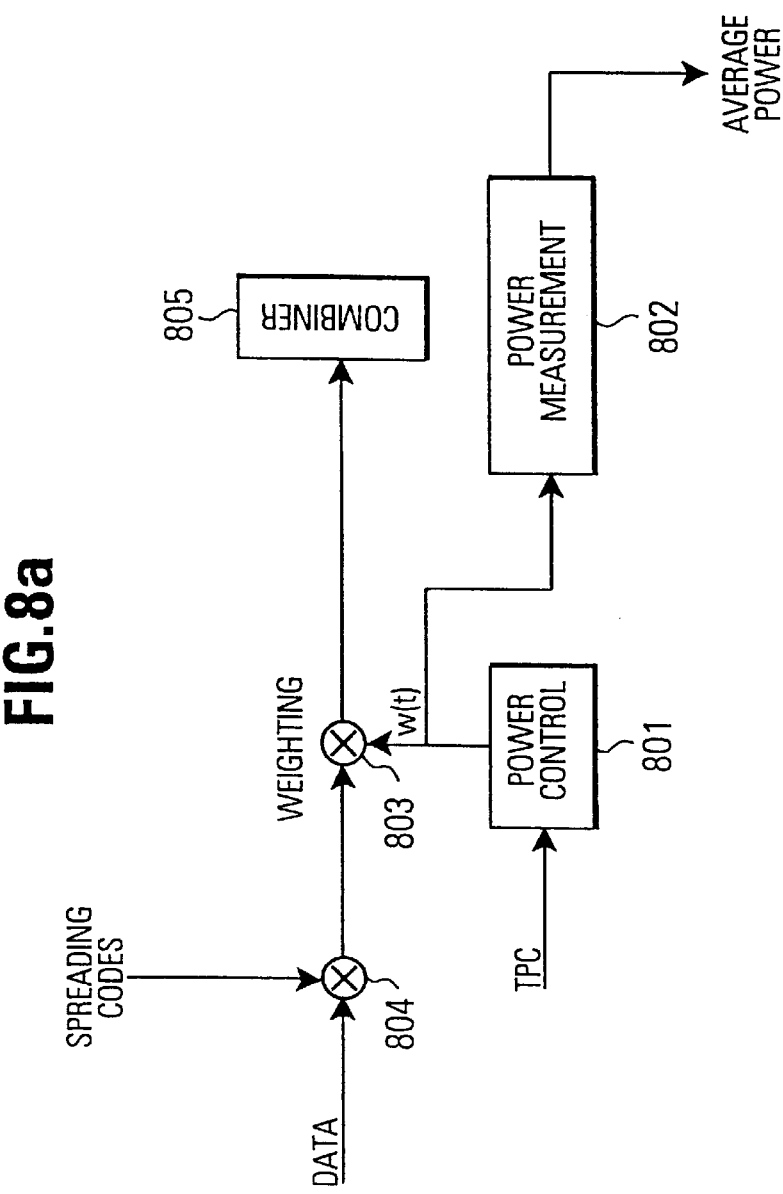
FIG. 8a shows an embodiment of the invention for performing power control and measurement operations.

FIG. 8a shows an embodiment of the invention for performing power control and measurement operations, e.g. in a CDMA telecommunications system with a plurality of channels.

FIG. 8a illustrates a power control circuit 801 for realizing a power control in accordance with TPC data received, which is preferably arranged as described with respect to previous embodiments. The power control device 801 outputs an adapted weight w(t) for each individual channel. For example, the power control operations carried out by the power control device 801 may correspond to the flow chart of FIG. 3 or the flow chart of FIG. 5 with corresponding description.

The output weight w(t) is supplied to a power measurement device 802, which preferably is arranged as described with respect to previous embodiments. For example, the power measurement device 802 carries out power measurement operations as outlined with respect to FIG. 6 and the corresponding flow chart of FIG. 7. The power measurement device 802 may output an average power value for each of the communication channels.

The output of the power control device 801 is further supplied to a weighting device for weighting an input signal computed by a data signal, spread using a corresponding spreading code in a spreading device 804. Thus, channel data spread by the spreading device 804 are weighted with the corresponding weight w(t) in the weighting device 803, the output of which is supplied to a combiner 805 for combining all individual channels to a combined signal.

In a straight forward approach, a power measurement was performed on channel data spread by the spreading unit 804, thus encountering very high data rates. According to the embodiment of FIG. 8a, however, it is possible to perform a power measurement while avoiding the high data rates of the spread channel data, by using the weight w(t) corresponding to a particular data channel for power measurement. This weight w(t) of a particular channel exhibits a far lower data rate, e.g. in correspondence to the rate of the TPC signal corresponding to the channel. In other words, a power measurement may be performed before spreading.

The device according to the embodiment of FIG. 8a can perform power control operations and power measurement operations for an arbitrary number of data channels by performing an interleaved pipeline processing of the invention.

FIG. 8b illustrates an example of an adapted weight and an average power value over time. This adapted channel weight w(t) corresponds to a single one of the plurality of data channels to be power controlled and measured according to the invention. As outlined with respect to previous embodiments, the weight w(t) is adapted in steps having a certain step size, which, in the example of FIG. 8b, is every 0.5 ms. Thus, a step function of the weight w(t) over time shown in FIG. 8b may appear. For comparison, the average power output of the power measurement device 802 is illustrated as well.

It is noted, that the step function of the weight w(t), output by the power control device 801 of FIG. 8a only constitutes an example, of course, different step functions and average power values may be obtained.

What is claimed is:

1. Apparatus for adjusting transmission power values of a plurality of data channels with unique channel addresses using a pipeline structure having plurality of pipeline stages (S1, S2, S3), comprising:

addressing means (110) for transmitting channel addresses between the pipeline stages, including time delay means (111, 112, 113) associated with each of the pipeline stages, for time delaying the transmission of the channel addresses between pipeline stages, memory means included into at least one of the pipeline stages and connected to the addressing means, for storing, at a plurality of locations corresponding to respective channel addresses, weights corresponding to transmission power values associated with each of the plurality of data channels, and processing means included into at least one of the pipeline stages, for processing at least the weights stored in the memory means (120) at locations specified by the channel addresses.

2. Apparatus according to claim 1, wherein
the memory means includes
a current weight storing unit (121) storing a current weight associated with each of the data channels,
a step size storing unit (122) storing a step size associated with each of the data channels, and
the processing means includes
adjusting means for incrementing or decrementing the current weight by the step size in accordance with an indicator indicating whether the channel power is to be increased or decreased.

3. Apparatus according to claim 2, wherein the incremented or decremented current weight is stored in the current weight storing unit using the time delayed current channel address.

4. Apparatus according to claim 2, wherein
at least one pipeline stage comprises limit storage means for storing at least one of upper and lower weight limits corresponding to each of the plurality of channel addresses, and
at least one stage comprises decision means for receiving a current weight of a channel and at least one weight limit according to the corresponding channel address and for limiting the channel weight accordingly.

5. Apparatus according to claim 2, comprising a step size setting unit for periodically updating the step sizes stored in the step size storage unit.

6. Apparatus according to claim 2, comprising a weighting circuit for weighting the channel signal in accordance with the corresponding channel weight.

7. Apparatus according to claim 2, wherein the data channels are channels of a CDMA telecommunications system and the channel weights correspond to the amplitudes of the data channels before combining the data channels into a CDMA signal for transmission.

8. Apparatus according to claim 1, wherein the memory means includes
a first storage unit (126) for storing a current weight associated with each of the data channels, and
a second storage unit (127) for storing accumulated channel weights associated with each of the data channels.

9. Apparatus according to claim 8, wherein the processing means includes
an address comparison circuit (135) for comparing two channel addresses subsequently transmitted via the addressing means (110), and
an adding circuit (137) for performing an add operation on a value received from the first storage unit (126) and a value received from the second storage unit (127) using a current channel address in case of inequality of the two subsequent addresses and for performing an add operation on a previous output value of the adding circuit and a value received from the first storage unit (126) in case of equality of the two subsequent addresses.

10. Apparatus according to claim 8, wherein the data channels are channels of a CDMA telecommunications system and the result of the adding operation is used for estimating a mean power value for each channel and is stored in the second storing unit using the time delayed current channel address.

11. Apparatus according to claim 8, wherein the memory means allows simultaneous read and write operations for allowing storing, in the memory means, a value corresponding to a current channel address simultaneously with reading a value corresponding to another channel address.

12. Apparatus according to claim 8, comprising a channel spreading unit, and wherein a channel power measurement is performed before the channels are spread by the spreading unit.

13. Apparatus for processing a plurality of data channels with unique channel addresses using a pipeline structure having plurality of pipeline stages (S1, S2, S3), comprising:

addressing means (110) for transmitting channel addresses between the pipeline stages, including time delay means (111, 112, 113) associated with each of the pipeline stages, for time delaying the transmission of the channel addresses between pipeline stages, memory means included into at least one of the pipeline stages and connected to the addressing means, for storing, at a plurality of locations corresponding to respective channel addresses, data associated with each of the plurality of data channels, the memory means including a current weight storing unit (121) storing a current weight associated with each of the data channels and a step size storing unit (122) storing a step size associated with each of the data channels, and processing means included into at least one of the pipeline stages, for processing at least data stored in the memory means (120) at locations specified by the channel addresses, including adjusting means for incrementing or decrementing the current weight by the step size in accordance with an indicator indicating whether the channel power is to be increased or decreased.

14. Apparatus according to claim 13, wherein the incremented or decremented current weight is stored in the current weight storing unit using the time delayed current channel address.

15. Apparatus according to claim 13, wherein
at least one pipeline stage comprises limit storage means for storing at least one of upper and lower weight limits corresponding to each of the plurality of channel addresses, and
at least one stage comprises decision means for receiving a current weight of a channel and at least one weight limit according to the corresponding channel address and for limiting the channel weight accordingly.

16. Apparatus according to claim 13, comprising a step size setting unit for periodically updating the step sizes stored in the step size storage unit.

17. Apparatus according to claim 13, comprising a weighting circuit for weighting the channel signal in accordance with the corresponding channel weight.

18. Apparatus according to claim 13, wherein the data channels are channels of a CDMA telecommunications system and the channel weights correspond to the amplitudes of the data channels before combining the data channels into a CDMA signal for transmission.

19. Apparatus according to claim 13, wherein the memory means allows simultaneous read and write operations for allowing storing, in the memory means, a value corresponding to a current channel address simultaneously with reading a value corresponding to another channel address.

20. Apparatus according to claim 13, comprising a channel spreading unit, and wherein a channel power measurement is performed before the channels are spread by the spreading unit.

21. Apparatus for processing a plurality of data channels with unique channel addresses using a pipeline structure having plurality of pipeline stages (S1, S2, S3), comprising:

addressing means (110) for transmitting channel addresses between the pipeline stages, including time delay means (111, 112, 113) associated with each of the pipeline stages, for time delaying the transmission of the channel addresses between pipeline stages, memory means included into at least one of the pipeline stages and connected to the addressing means, for storing, at a plurality of locations corresponding to respective channel addresses, data associated with each of the plurality of data channels, the memory means including a first storage unit (126) for storing a current weight associated with each of the data channels and a second storage unit (127) for storing accumulated channel weights associated with each of the data channels, and processing means included into at least one of the pipeline stages, for processing at least data stored in the memory means (120) at locations specified by the channel addresses.

22. Apparatus according to claim 21, wherein the processing means includes
an address comparison circuit (135) for comparing two channel addresses subsequently transmitted via the addressing means (110), and
an adding circuit (137) for performing an add operation on a value received from the first storage unit (126) and a value received from the second storage unit (127) using a current channel address in case of inequality of the two subsequent addresses and for performing an add operation on a previous output value of the adding circuit and a value received from the first storage unit (126) in case of equality of the two subsequent addresses.

23. Apparatus according to claim 21, wherein the data channels are channels of a CDMA telecommunications system and the result of the adding operation is used for estimating a mean power value for each channel and is stored in the second storing unit using the time delayed current channel address.

24. Apparatus according to claim 21, wherein the memory means allows simultaneous read and write operations for allowing storing, in the memory means, a value corresponding to a current channel address simultaneously with reading a value corresponding to another channel address.

25. Apparatus according to claim 21, comprising a channel spreading unit, and wherein a channel power measurement is performed before the channels are spread by the spreading unit.

26. Method for adjusting transmission power values of a plurality of data channels with unique addresses using a pipeline structure having a plurality of pipeline stages and including addressing means (110) for transmitting channel addresses between the pipeline stages, memory means (120) for storing a plurality of locations corresponding to respective channel addresses weights corresponding to transmission power values associated with the plurality of data channels, and processing means (130) for processing at least channel specific data stored in the memory means (120) at locations specified by the channel addresses, the method comprising the steps of:

receiving a channel address of a data channel at a first pipeline stage via the addressing means, reading a weight corresponding to a transmission power value associated with the channel address from the memory means, transmitting the read weight and the channel address to a second pipeline stage, processing the weight at the second pipeline stage, time delaying the transmission of the channel address between pipeline stages, and forwarding the channel address and the processing result to a third pipeline stage.

27. Method according to claim 26, wherein
the data, read from the memory means, comprise a step size and a current weight associated with one of the data channels, and
the processing includes incrementing or decrementing the current weight by the step size, in accordance with an indicator indicating whether the power is to be increased or decreased.

28. Method according to claim 27, wherein the incremented or decremented current weight is stored in the memory means using the time delayed channel address.

29. Method according to claim 27, wherein the step sizes are periodically updated in accordance with an external parameter.

30. Method according to claim 26, wherein a weighting circuit weights a channel signal in accordance with an associated channel weight.

31. Method according to claim 26, wherein the data channels are channels of a CDMA telecommunications system and channel weights correspond to the amplitudes of the data channels before combining the data channels into a CDMA signal for transmission.

32. Method according to claim 26, wherein
the data, read from the memory means, comprise an accumulated channel weight and a current channel weight associated with one of the data channels, and
the processing includes comparing two channel addresses subsequently transmitted via the addressing means, and performing an add operation on a value received from the first storage unit and a value received from the second storage unit using a current channel address in case of inequality of the two subsequent addresses and for performing an add operation on a previous output value of the adding circuit and a value received from the first storage unit in case of equality of the two subsequent addresses.

33. Method according to claim 32, wherein the data channels are channels of a CDMA telecommunications system and the result of the add operation is used for estimating a channel power value and is stored in the first storing unit using the time delayed current channel address.

34. Method according to claim 26, wherein the memory means allows simultaneous read and write operations for allowing storing, in the memory means, a value corresponding to the current channel address simultaneously with reading a value corresponding to another channel address.

35. Method according to claim 26, wherein a channel power measurement is performed before the channels are spread by a channel spreading unit.

36. Method for processing a plurality of data channels with unique addresses using a pipeline structure having a plurality of pipeline stages and including addressing means (110) for transmitting channel addresses between the pipeline stages, memory means (120) for storing at a plurality of locations corresponding to respective channel addresses, data associated with the plurality of data channels, and processing means (130) for processing at least channel specific data stored in the memory means (120) at locations specified by the channel addresses, the method comprising the steps of:
receiving a channel address of a data channel at a first pipeline stage via the addressing means,
reading data associated with the channel address from the memory means, including a step size and a current weight associated with one of the data channels,
transmitting the read data and the channel address to a second pipeline stage,
processing the data at the second pipeline stage, including incrementing or decrementing the current weight by the step size, in accordance with an indicator indicating whether the power is to be increased or decreased, and
forwarding the channel address and the processing result to a third pipeline stage.

37. Method according to claim 36, wherein the incremented or decremented current weight is stored in the memory means using the time delayed channel address.

38. Method according to claim 36, wherein the step sizes are periodically updated in accordance with an external parameter.

39. Method according to claim 36, wherein a weighting circuit weights the channel signal in accordance with the associated channel weight.

40. Method according to claim 36, wherein the data channels are channels of a CDMA telecommunications system and the channel weights correspond to the amplitudes of the data channels before combining the data channels into a CDMA signal for transmission.

41. Method according to claim 36, wherein the memory means allows simultaneous read and write operations for allowing storing, in the memory means, a value corresponding to the current channel address simultaneously with reading a value corresponding to another channel address.

42. Method according to claim 36, wherein a channel power measurement is performed before the channels are spread by a channel spreading unit.

43. Method for processing a plurality of data channels with unique addresses using a pipeline structure having a plurality of pipeline stages and including addressing means (110) for transmitting channel addresses between the pipeline stages, memory means (120) for storing at a plurality of locations corresponding to respective channel addresses, data associated with the plurality of data channels, and processing means (130) for processing at least channel specific data stored in the memory means (120) at locations specified by the channel addresses, the method comprising the steps of:
receiving a channel address of a data channel at a first pipeline stage via the addressing means,
reading data associated with the channel address from the memory means, including an accumulated channel weight and a current channel weight associated with one of the data channels, and
transmitting the read data and the channel address to a second pipeline stage,
processing the data at the second pipeline stage, including comparing two channel addresses subsequently transmitted via the addressing means, and performing an add operation on a value received from the first storage unit and a value received from the second storage unit using a current channel address in case of inequality of the two subsequent addresses and for performing an add operation on a previous output value of the adding circuit and a value received from the first storage unit in case of equality of the two subsequent addresses, and
forwarding the channel address and the processing result to a third pipeline stage.

44. Method according to claim 43, wherein the data channels are channels of a CDMA telecommunications system and the result of the add operation is used for estimating a channel power value and is stored in the first storing unit using the time delayed current channel address.

45. Method according to claim 43, wherein the memory means allows simultaneous read and write operations for allowing storing, in the memory means, a value corresponding to the current channel address simultaneously with reading a value corresponding to another channel address.

46. Method according to claim 43, wherein a channel power measurement is performed before the channels are spread by a channel spreading unit.

* * * * *